US008723695B2

(12) United States Patent
Bourret et al.

(10) Patent No.: US 8,723,695 B2
(45) Date of Patent: May 13, 2014

(54) METHOD AND DEVICE FOR AUTOMATICALLY DETERMINING AN ERRONEOUS HEIGHT VALUE OF A RADIOALTIMETER MOUNTED ON AN AIRCRAFT

(75) Inventors: Thierry Bourret, Toulouse (FR);
Pierre-Antoine Lierman, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 330 days.

(21) Appl. No.: 13/209,780

(22) Filed: Aug. 15, 2011

(65) Prior Publication Data
US 2012/0056760 A1 Mar. 8, 2012

(30) Foreign Application Priority Data

Sep. 6, 2010 (FR) ...................................... 10 57050

(51) Int. Cl.
*G08B 23/00* (2006.01)
(52) U.S. Cl.
USPC ................... 340/970; 340/977; 701/4; 701/9; 342/65; 73/178 H; 73/178 T; 73/178 R
(58) Field of Classification Search
USPC ...................... 340/970, 977; 701/4, 9; 342/65, 342/120–122; 73/178 H, 178 T, 178 R
See application file for complete search history.

(56) References Cited

U.S. PATENT DOCUMENTS

| | | | |
|---|---|---|---|
| 3,715,718 A | 2/1973 | Astengo | |
| 4,019,702 A * | 4/1977 | Annin | 244/182 |
| 4,241,346 A * | 12/1980 | Watson | 342/74 |
| 4,431,994 A * | 2/1984 | Gemin | 342/120 |
| 4,733,239 A * | 3/1988 | Schmitt | 342/94 |
| 4,939,513 A | 7/1990 | Paterson et al. | |
| 5,410,317 A | 4/1995 | Ostrom et al. | |
| 6,204,779 B1 * | 3/2001 | Berlioz et al. | 340/970 |
| 8,044,842 B2 * | 10/2011 | Thomas et al. | 342/120 |
| 2001/0047230 A1 * | 11/2001 | Gremmert et al. | 701/4 |
| 2002/0077731 A1 * | 6/2002 | Hilb | 701/4 |
| 2004/0186635 A1 * | 9/2004 | Manfred | 701/4 |
| 2006/0044182 A1 * | 3/2006 | Vacanti | 342/120 |
| 2007/0024469 A1 * | 2/2007 | Chou | 340/994 |

FOREIGN PATENT DOCUMENTS

FR 2102182 4/1972

OTHER PUBLICATIONS

French Patent Office, International Search Report FR 1057050 (2 pgs.), Apr. 15, 2011.

* cited by examiner

*Primary Examiner* — Nabil Syed
*Assistant Examiner* — Nay Tun
(74) *Attorney, Agent, or Firm* — Wood, Herron & Evans, LLP

(57) ABSTRACT

A method for automatically detecting an erroneous height value supplied by a radio altimeter mounted on an aircraft. The method includes measuring, during the aircraft's approach phase with a view to landing, the duration between the times when a first predetermined altitude threshold and a second predetermined altitude threshold are reached. This duration is measured by taking into account current height values supplied by the radio altimeter. The method then includes comparing the measured duration to a predetermined duration reference time, which is lower than a flight duration that would allow the aircraft to descend from the first predetermined altitude threshold to the second predetermined altitude threshold at a maximum vertical speed. An erroneous height value is detected if the measured duration is lower than the predetermined duration reference time.

18 Claims, 1 Drawing Sheet

METHOD AND DEVICE FOR AUTOMATICALLY DETERMINING AN ERRONEOUS HEIGHT VALUE OF A RADIOALTIMETER MOUNTED ON AN AIRCRAFT

TECHNICAL FIELD

The present invention relates to a method and a device for automatically detecting an erroneous height value supplied by a radio altimeter, mounted on an aircraft, in particular a transport airplane.

BACKGROUND

It is known that the autopilot system and the flight control systems of modern transport airplanes generally cooperate with one or more radio altimeters being able to measure the height with respect to the ground. Such a measurement is mainly used at the vicinity of the ground by the autopilot system for the guidance upon an automatic landing, and by flight control systems for carrying out piloting law transitions, for modifying slaving logics of some steerings (horizontal plane for example) or for taking into account the ground effects and piloting objectives associated with the flight phases to be considered.

Because of the commonly used technology (measurement of radio echoes), allowing the height to be deduced with respect to the ground by measuring the propagation time of radio waves, it could occur, more specifically, when the antenna facility becomes impaired or when water flows down on the antennas, that the radio altimeter delivers an erroneous height measurement, being abnormally low.

When the radio altimeter supplies an abnormally low height, the systems receiving such a height use an erroneous piece of information able to result, for the autopilot system, in an erroneous guidance (for instance an early triggering of the guidance of the flare-out), and for the flight control systems in an appropriate development of parameters.

Although the consequences of such a deficiency could be managed by the crew, thanks, more specifically, to usual alarms allowing the effects of the deficiency to be detected, the aim of the present invention is to simplify the operational impact on the systems (for example the use of another radio altimeter that would not have a detected anomaly), providing an advantageous solution for detecting this type of deficiency, including in the vicinity of the ground.

The usual means enabling to detect abnormally low values of a radio altimeter are based on the comparison between two values issued from two completely independent radio altimeters. If a significant difference between the two measures occurs, an alarm is generally emitted, and some systems use the most likely value as a function of the aerodynamic configuration of the airplane (position of the slats and flaps, position of the landing gear, speed of the airplane, etc.).

These logics, although they allow the effects of the deficiency to be managed, only operate when the airplane is provided with two radio altimeters, and can induce a significant operational hindrance (throttling up in approach, diverting to an airport with better weather conditions, etc.).

The present invention aims at solving the above mentioned drawbacks. It relates to a method for automatically detecting an erroneous height value, that is a value with an abnormally low height, being supplied by a radio altimeter mounted on an aircraft, in particular a transport airplane.

SUMMARY OF THE INVENTION

According to this invention, said method is remarkable in that, during an approach phase of the aircraft, with a view to landing, the following operations are automatically performed:

a1) the duration is measured between the moments where two thresholds are reached relative to the altitude, by taking into account the current height values supplied by said radio altimeter;

b1) such a measured duration is compared to a predetermined reference time, being lower than a flight duration allowing the aircraft to descend from the highest threshold (of said thresholds) to the lowest threshold (of said thresholds) and this, at a maximum vertical approach speed of said aircraft; and c1) if said duration is lower than said reference time, an erroneous height value is detected.

Thus, thanks to this invention, it is possible to detect an erroneous height value, that is a value with an abnormally low height, being supplied by a radio altimeter, during an approach phase of the aircraft with a view to landing. As explained below, the method according to this invention is implemented by means of measurements performed by one single same radio altimeter. Furthermore, the thus implemented detection is very reliable so that it is not likely to detect as erroneous a value being correct.

Moreover, the present invention could be applied to both a manually piloted aircraft as well as an automatically piloted aircraft.

In a first embodiment, said aircraft is manually piloted, in a usual way, during the approach phase and at step a1);

the current height value is supplied repeatedly by said radio altimeter to first and second predetermined altitude thresholds; and the duration is measured between the moment where a current height value becomes lower than the first altitude threshold and the following moment where another current height value becomes lower than the second altitude threshold (being lower than said first altitude threshold).

In addition, in a second embodiment, during the approach phase, said aircraft is automatically piloted by usual autopilot system, and at step a1):

said highest threshold corresponds to a triggering threshold of a usual landing mode, managed by the autopilot system, such a triggering depending on the current height value supplied by the radio altimeter; and said lowest threshold corresponds to a triggering threshold of a usual flare-out mode, also managed by the autopilot system, such a triggering also depending on the current height value supplied by the radio altimeter.

The aim of the present invention is thus to detect an erroneous height value supplied by a radio altimeter mounted on an aircraft, being located in the vicinity of the ground. In the basic embodiment above set forth, it applies to an approach phase of an aircraft with a view to landing. It could, however, also apply to another phase in the vicinity of the ground, that is a take-off/throttling up phase of the aircraft.

In such an application, the following operations are automatically performed:

a2) if appropriate, the duration is measured, for which the three following conditions are simultaneously met:

the aircraft is in a situation representative of a take-off/throttling up phase;

the barometric altitude gain is higher than a predetermined value; and the current height value supplied by the radio altimeter is lower than a threshold value;

b2) this duration is compared to a predetermined auxiliary reference time; and c2) if said duration is higher than said auxiliary reference time, an erroneous height value is detected.

Thus, thanks to this application, it is possible to detect an erroneous height value, that is a value with an abnormally low height, being supplied by a radio altimeter, during a take-off/throttling up phase of the aircraft, only using the values of one single radio altimeter.

Advantageously, said current barometric altitude gain corresponds to the difference between, on the one hand, a barometric altitude measured and memorized at the time where the take-off/throttling up phase is initiated, and on the other hand, a current barometric altitude of the aircraft.

In addition, in this application, the present invention could also be implemented not only on a manually piloted aircraft but also on an automatically piloted aircraft.

In a first embodiment, wherein said aircraft is piloted manually, it is considered, in step a2), that the aircraft is in a situation representative of a take-off/throttling up phase, when the throttle lever is brought to a predetermined take-off/throttling up position, of the Take-Off/Go-Around ("TOGA") usual type.

In addition, in a second embodiment, wherein said aircraft is piloted automatically by a usual autopilot system, it is considered, at step a2), that the aircraft is in a situation representative of a take-off/throttling up phase, when a take-off mode or a throttling up mode, of the usual type, is activated on said autopilot system.

If a value with an abnormally low height is detected by means of one of the above mentioned embodiments, the use of such an erroneous height value by the systems of the aircraft is prevented, and a corresponding alarm can also be emitted for warning the crew of such detection. In such a situation, as transport airplanes, more specifically, are generally provided with two radio altimeters, the systems use the values supplied by the other radio altimeter (not having the anomaly detected on the first radio altimeter).

The present invention also relates to a device for automatically detecting an erroneous height value, that is a value with an abnormally low height, being supplied by a radio altimeter mounted on an aircraft, in particular a transport airplane.

To this end, said automatic detection device comprises according to this invention:

first means for monitoring parameters available on the aircraft and for automatically measuring, during an approach phase with a view to a landing of the aircraft, the duration between the times where two thresholds are reached relative to the altitude, by taking into account the current height values supplied by said radio altimeter; and second means for comparing, automatically, such a measured duration to a predetermined reference time, being lower than a flight duration allowing the aircraft to descend from the highest threshold of said thresholds to the lowest threshold at a maximum vertical approach speed of said aircraft; and for detecting an erroneous height value, if said measured duration is lower than said reference time.

Additionally, in a particular embodiment, said device further comprises:

third means for monitoring parameters available on the aircraft and for, during a take-off/throttling up phase of the aircraft, measuring if appropriate the duration for which the three following conditions are simultaneously met:

the aircraft is in a situation representative of a take-off/throttling up phase;

barometric altitude gain is higher than a predetermined value; and current height value supplied by the radio altimeter is lower than a threshold value;

fourth means for comparing such a measured duration to a predetermined auxiliary reference time, and for detecting an erroneous height value, if said measured duration is higher than said reference time.

The automatic detection device according to the present invention could be applied to both a manually piloted aircraft as well as an automatically piloted aircraft.

The present invention further relates to:

a system for generating a height value of an aircraft, comprising at least one radio altimeter and at least one automatic detection device, such as mentioned herein above; and/or an aircraft, in particular a transport airplane, being provided with such an automatic detection device or such a system.

BRIEF DESCRIPTION OF THE DRAWINGS

The FIGS. of the appended drawing will better explain how this invention can be implemented. In these figures, like reference numerals relate to like components.

DETAILED DESCRIPTION

Figure 1:
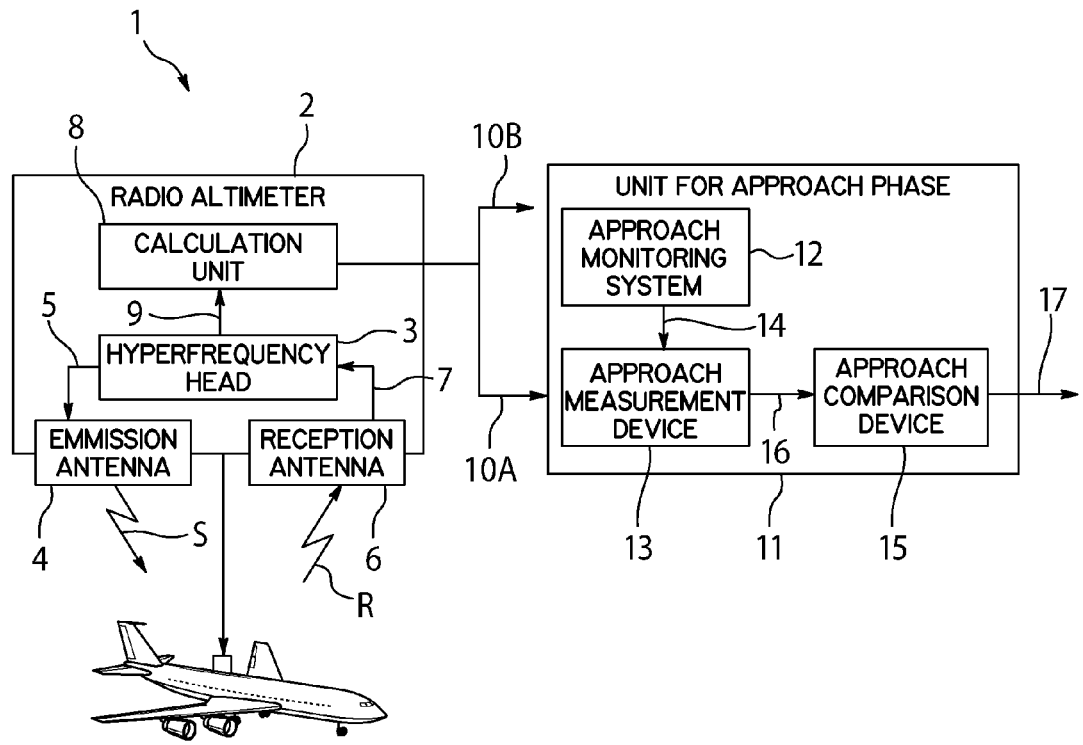
FIG. 1 schematically shows a device according to the invention, in an embodiment adapted for an approach phase of an aircraft provided with said device.

The device 1 according to this invention and schematically shown on FIG. 1 is intended for automatically detecting an erroneous height value supplied by a radio altimeter 2 being mounted on an aircraft, in particular a transport airplane, and more particularly for detecting a value with an abnormally low height.

In a usual embodiment, said radio altimeter 2 comprises:

a hyperfrequency head 3 able to emit and to receive hyperfrequency electromagnetic waves;

an emission antenna 4 connected to the hyperfrequency head 3, as indicated by a link 5, and able to provide the emission to the earth (not shown) of an electromagnetic wave S emitted by said hyperfrequency head 3;

a reception antenna 6 able to ensure the reception of an electromagnetic wave R corresponding to the electromagnetic wave S emitted by the emission antenna 4 and sent back by the earth, and to address it to said hyperfrequency head 3, as indicated by a link 7; and a calculation unit 8 able to determine, from data received from said hyperfrequency head 3 via a link 9, the height of the aircraft with respect to the ground and transmit it via a link 10A, 10B.

According to this invention, in a basic embodiment, said device 1 comprises a unit 11 being intended for an approach phase of the aircraft with a view to landing on a runway of an airport (not shown). Such a unit 11 is connected to the radio altimeter 2 by the link 10A, and comprises, as shown on FIG. 1:

an approach monitoring system 12 that monitors parameters available on the aircraft, to be set forth below;

an approach measurement device 13 being connected via a link 14 to the approach monitoring system 12 that automatically measures, during an approach phase with a view to a landing of the aircraft, the duration T1A, T1B between the times where two thresholds are reached relative to the altitude, by taking into account the current height values supplied by said radio altimeter 2, as set forth below; and an approach comparison device 15 being connected via a link 16 to the approach measurement device 13 that compares, automatically, the duration T1A, T1B measured by the approach measurement device 13 to a predetermined reference time $\Delta T1A$, $\Delta T1B$. This reference time $\Delta T1A$, $\Delta T1B$ is lower than a flight duration allowing the aircraft to descend from the highest threshold (of said two thresholds) to the lowest threshold at a (usual) approach maximum vertical speed of said aircraft. The approach comparison device 15 detects an erroneous height value, if said measured duration T1A, T1B is lower than said reference time $\Delta T1A$, $\Delta T1B$, which is actually impossible and is due to an anomaly relating to the radio altimeter 2, and the approach comparison device 15 transmits the result of such detection via a link 17.

Consequently, the on-board device 1, according to this invention, is able to detect an erroneous height value, that is a value with an abnormally low height, being supplied by the radio altimeter 2 during an approach phase of the aircraft with a view to a landing, only using the height values of this radio altimeter 2. Furthermore, the detection implemented by the device 1 is very reliable.

Moreover, said device 1 could be applied to both a manually piloted aircraft as well as an automatically piloted aircraft.

In a first alternative embodiment of said basic embodiment, the device 1 further comprises a usual piloting means (not shown) for manually piloting the aircraft during the approach phase, and the approach measurement device 13 comprises the following elements (not shown):

an element for comparing the current height value supplied by said radio altimeter 2 to first and second predetermined altitude thresholds ZRA1, ZRA2, for example 200 feet (approximately 60 meters) and 6 feet (less than 2 meters) respectively; and an element for measuring the duration T1A between the time where a current height value of the radio altimeter 2 becomes lower to the first altitude threshold ZRA1 and the following time where a current height value becomes lower than the second altitude threshold ZRA2 (being lower than said first altitude threshold ZRA1).

In this first alternative embodiment, said duration T1A is afterwards compared to the reference time $\Delta T1A$, for example 0.5 second, being lower than a flight duration $\Delta T0$ allowing the aircraft to descend from the highest threshold ZRA1 to the lowest threshold ZRA2 at a maximum vertical approach speed VZmax of said aircraft: $\Delta T0=(ZRA1-ZRA2)/VZmax$.

Furthermore, in a second alternative embodiment of said basic embodiment, said device 1 further comprises a usual autopilot system for automatically piloting the aircraft during the approach phase.

In addition, in this second alternative embodiment:

said highest threshold ZRB1, for example 400 feet (approximately 120 meters), corresponds to a triggering threshold of a usual landing mode, managed by said autopilot system. Such a landing mode is triggered, in a usual way, when the current height value supplied by the radio altimeter 2 is lower than such a threshold ZRB1; and said lowest threshold ZRB2, for example 50 feet (approximately 15 meters), corresponds to a triggering threshold of a usual flare-out mode, also managed by the autopilot system. Such a landing mode is triggered, in a usual way, when the current height value supplied by the radio altimeter 2 is lower than such a threshold ZRB2.

In this second alternative embodiment, the approach measurement device 13 comprises elements (not shown) for automatically measuring, during an approach phase with a view to a landing of the aircraft, the duration T1B between the time where said landing mode is triggered and the time where said flare-out mode is triggered. This duration T1B is afterwards compared to the reference time $\Delta T1B$, for example 2 seconds.

If this reference time $\Delta T1B$ is lower than a properly selected threshold being lower than a time relative to the maximum joining vertical speed, authorized by the certified field of use of the autopilot system in a landing mode, it is sure that the device 1 will never dismiss, inappropriately, a radio altimeter 2 operating correctly.

Figure 2:
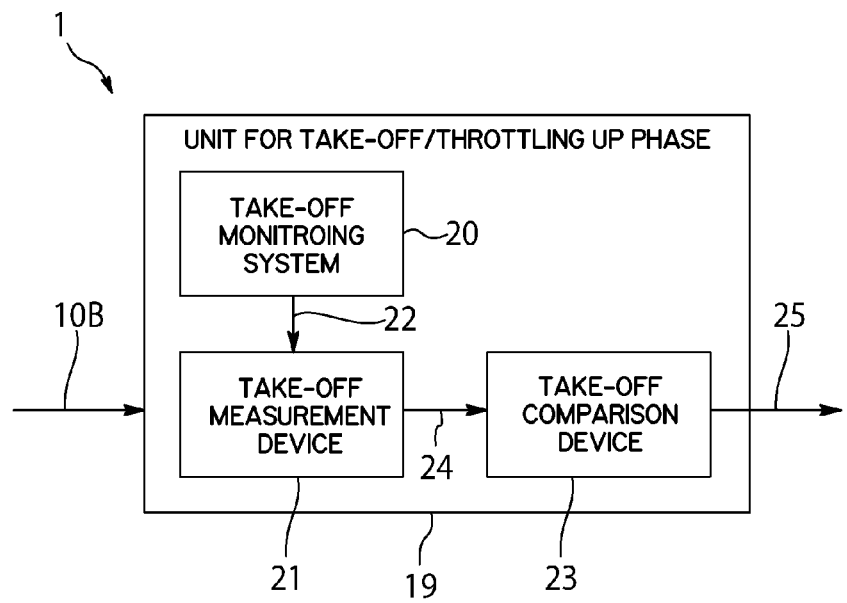
FIG. 2 schematically shows a device according to this invention, in an embodiment adapted for a take-off/throttling up phase of the aircraft provided with said device.

In a preferred embodiment, said device 1 further comprises a unit 19 being intended for a take-off/throttling up phase of the aircraft. Such a unit 19 is connected to the radio altimeter 2 by the link 10B, and comprises, as shown on FIG. 2:

a take-off monitoring system 20 that monitors parameters available on the aircraft, to be set forth below;

a take-off measurement device 21 being connected via a link 22 to the take-off monitoring system 20 that measures, during a take-off/throttling up phase of the aircraft, if appropriate, the duration T2A, T2B for which the three following conditions are simultaneously met:

the aircraft is in a situation representative of a take-off/throttling up phase;

a current barometric altitude gain $\Delta Zbaro$ is higher than a predetermined value Z1, Z2; and current height value supplied by the radio altimeter 2 is lower than a threshold value ZRA3, ZRA4; and A take-off comparison device 23 being connected via a link 24 to said means the take-off measurement device 21 that compares this duration T2A, T2B measured by the take-off measurement device 21 to a predetermined auxiliary reference time $\Delta T2A$, T2B. The take-off comparison device 23 detects an erroneous height value, if said measured duration T2A, T2B is higher than said auxiliary reference time $\Delta T2A$, $\Delta T2B$, and they transmit the take-off comparison device 23 transmits the result via a link 25.

In this preferred embodiment, the device 1 according to this invention is thus able to detect, using the unit 19, an erroneous height value, that is a value with an abnormally low height, being supplied by the radio altimeter 2, during a take-off/throttling up phase of the aircraft.

Furthermore, such a preferred embodiment could be applied to both a manually piloted aircraft as well as an automatically piloted aircraft.

Said current barometric altitude gain $\Delta Zbaro$ corresponds to the difference between, on the one hand, a barometric altitude measured and memorized at the time where the take-off/throttling up phase is initiated, and on the other hand, a current barometric altitude of the aircraft.

In a first alternative embodiment of said preferred embodiment, said device 1 comprises usual piloting means (not shown) for manually piloting the aircraft during the approach phase. Moreover, in this first alternative embodiment, it is considered that the aircraft is in a situation representative of a take-off/throttling up phase, when the throttle lever is brought to a predetermined take-off/throttling up position, of the usual TOGA type.

In this first alternative embodiment, the unit 19 detects a value with an abnormally low height when, simultaneously:

the throttle lever is brought in a predetermined take-off/throttling up position;

the current barometric altitude gain $\Delta Zbaro$ is higher than a predetermined value Z1, for example 400 feet (approximately 120 meters); and the current height value supplied by the radio altimeter 2 is lower than a threshold value ZRA3, for example 6 feet (approximately 1.8 meters), for a duration T2A being higher than a predetermined auxiliary reference time ΔT2A, for example 4 seconds.

Furthermore, in a second alternative embodiment of said preferred embodiment, said device 1 further comprises a usual autopilot system for automatically piloting the aircraft during the approach phase. Furthermore, in this second alternative embodiment, it is considered that the aircraft is in a situation representative of a take-off/throttling up phase, when a usual take-off mode or a usual throttling up mode is activated on said autopilot system.

In this second alternative embodiment, the unit 19 detects a value with an abnormally low height when, simultaneously:
the take-off mode or the throttling up mode is activated on the autopilot system;
the current barometric altitude gain ΔZbaro is higher than a predetermined value Z2, for example 200 feet (approximately 60 meters); and
the current height value supplied by the radio altimeter 2 is lower than a threshold value ZRA4, for example 50 feet (approximately 15 meters), for a duration T2B being higher than a predetermined auxiliary reference time ΔT2B, for example 15 seconds.

In a simplified embodiment, for the values of height threshold, values are used being available on the aircraft, and the reference times are simply adapted to such already available values.

The present invention thus relates to a device 1 for automatically detecting abnormally low values supplied by a radio altimeter 2, based on information usually available on board the aircraft, that is:
in approach, using a time difference between two ground height thresholds or two modes of the autopilot system; and
upon take-off or upon throttling up, using a time for which the value of ground height remains low.

Judiciously, the times and the thresholds are determined so that the monitorings implemented by the device 1 never inappropriately incriminate a radio altimeter 2 operating correctly upon the normal use of the aircraft.

The present invention further relates to a system for generating a height value of an aircraft, comprising at least one radio altimeter 2 and at least one automatic detection device 1 such as above mentioned.

Preferably, said system comprises at least two radio altimeters 2. In such a case, if a value with an abnormally low height is detected by the device 1 (according to one of the above mentioned embodiments) on one of these radio altimeters 2, said system prevents the use of (erroneous) height values of this radio altimeter 2 by usual systems or equipment of the aircraft, and said usual systems or equipment then use the values supplied by the other radio altimeter, as long as the latter are considered as not erroneous.

Furthermore, said device 1 and/or said system could also comprise means (not shown) for emitting an alarm of the visual or sound type, to the crew upon the detection of an erroneous height value. They can, further, comprise means (not shown) for notifying to the maintenance operators an anomaly requiring maintenance actions (cleaning antennas, checking the facility, etc.).

The invention claimed is:

1. A method for automatically detecting an erroneous height value supplied by a radio altimeter mounted on an aircraft, the method comprising:
automatically performing the following operations during an approach phase of the aircraft with a view to landing:
(a1) measuring, by an approach measurement device, a first measured duration between a first time when the aircraft reaches a first predetermined, constant altitude threshold and a second time when the aircraft reaches a second predetermined, constant altitude threshold by taking into account altitude measurements indicative of current height values supplied by the radio altimeter;
(b1) comparing, by an approach comparison device, the first measured duration from step (a1) to a predetermined duration reference time, which is lower than a flight duration allowing the aircraft to descend from the first predetermined, constant altitude threshold to the second predetermined, constant altitude threshold at an approach of maximum vertical speed of the aircraft; and
(c1) detecting an erroneous height value if the measured first duration from step (a1) is lower than the predetermined duration reference time, wherein the detection of the erroneous height value in step (c1) is performed solely on the basis of altitude measurements from the radio altimeter, and wherein the erroneous height value is indicative of the radio altimeter malfunctioning.

2. The method according to claim 1, wherein the aircraft is manually piloted during the approach phase, and wherein step (a1) further comprises:
repeatedly comparing, by the approach measurement device, the current height values supplied by the radio altimeter to the first and second predetermined, constant altitude thresholds during the approach phase.

3. The method according to claim 1, wherein during the approach phase, said aircraft is automatically piloted by an autopilot system, and wherein step (a1) further comprises:
triggering, by the autopilot when the aircraft reaches the first predetermined, constant altitude threshold, a landing mode managed by the autopilot system, the triggering of the landing mode therefore being dependent on the current height value supplied by the radio altimeter; and
triggering, by the autopilot system when the aircraft reaches the second predetermined, constant altitude threshold, a flare-out mode managed by the autopilot system, the triggering of the flare-out mode therefore being dependent on the current height value supplied by the radio altimeter.

4. The method according to claim 1, further comprising:
automatically performing the following operations during a take-off/throttling up phase of the aircraft:
(a2) measuring, by a take-off measurement device, a second measured duration for which the three following conditions are simultaneously met:
the aircraft is in a situation representative of the take-off/throttling up phase;
a current barometric altitude gain is higher than a predetermined barometric value, using a current barometric altitude received by a take-off monitoring system communicating with a barometric altimeter mounted on the aircraft; and
the current height value supplied by the radio altimeter is lower than a third predetermined, constant altitude threshold value;
(b2) comparing the second measured duration from step (a2) to a predetermined auxiliary reference time; and
(c2) detecting an erroneous height value if the second measured duration from step (a2) is higher than the predetermined auxiliary reference time, wherein the detection of the erroneous height value in step (c2) is performed solely on the basis of altitude measurements from the radio altimeter and from the barometric altimeter, and wherein the erroneous height value is indicative of the radio altimeter malfunctioning.

5. The method according to claim 4, wherein the current barometric altitude gain corresponds to the difference between a barometric altitude measured at a time where the take-off/throttling up phase is initiated and the current barometric altitude of the aircraft.

6. The method according to claim 4, wherein the aircraft is manually piloted, and wherein the aircraft is considered to be in a situation representative of the take-off/throttling up phase when a throttle lever is brought in a predetermined take-off/throttling up position.

7. The method according to claim 4, wherein the aircraft is automatically piloted by an autopilot system, and wherein the aircraft is considered to be in a situation representative of the take-off/throttling up phase when a take-off mode or a throttling up mode is activated on the autopilot system.

8. The method according to claim 1, further comprising:
(d1) generating a signal to perform at least one of the following actions when the erroneous height value is detected in step (c1): suppress use of altitude measurements from the radio altimeter that is malfunctioning by other aircraft systems, emit an alarm to a crew regarding the radio altimeter malfunctioning, and notify maintenance personnel regarding a need to fix the radio altimeter that is malfunctioning.

9. The method according to claim 1, wherein the comparing of the measured duration to the predetermined duration reference time in step (b1) is performed only a single time during each approach phase operated by the aircraft, thereby limiting use of resources on the aircraft to determine when the radio altimeter is malfunctioning.

10. A device for automatically detecting an erroneous height value supplied by a radio altimeter mounted on an aircraft, comprising:
an approach monitoring system that monitors parameters available on the aircraft;
an approach measurement device that, during an approach phase of the aircraft, with a view to a landing of the aircraft, measures a first measured duration between a first time when the aircraft reaches a first predetermined, constant altitude threshold and a second time when the aircraft reaches a second predetermined, constant altitude threshold by taking into account altitude measurements indicative of current height values supplied by the radio altimeter; and
an approach comparison device that compares the first measured duration obtained by the approach measurement device to a predetermined duration reference time, which is lower than a flight duration allowing the aircraft to descend from the first predetermined, constant altitude threshold to the second predetermined, constant altitude threshold at an approach of maximum vertical speed of the aircraft,
wherein the approach comparison device detects an erroneous height value if the measured first duration obtained by the approach measurement device is lower than the duration reference time, wherein the detection of the erroneous height value by the approach comparison device is performed solely on the basis of altitude measurements from the radio altimeter, and wherein the erroneous height value is indicative of the radio altimeter malfunctioning.

11. The device according to claim 10, further comprising:
a take-off monitoring system that monitors parameters available on the aircraft;
a take-off measurement device that, during a take-off/throttling up phase of the aircraft, measures a second measured duration for which the three following conditions are simultaneously met:
the aircraft is in a situation representative of a take-off/throttling up phase;
a current barometric altitude gain is higher than a predetermined barometric value, using a current barometric altitude received by the take-off monitoring system communicating with a barometric altimeter mounted on the aircraft; and
the current height value supplied by the radio altimeter is lower than a third predetermined, constant altitude threshold value; and
a take-off comparison device that compares the second measured duration to a predetermined auxiliary reference time, and wherein the take-off comparison device detects an erroneous height value if the second measured duration is higher than the predetermined auxiliary reference time, wherein the detection of the erroneous height value by the take-off comparison device is performed solely on the basis of altitude measurements from the radio altimeter and from the barometric altimeter, and wherein the erroneous height value is indicative of the radio altimeter malfunctioning.

12. The device according to claim 10, wherein when the approach comparison device detects an erroneous height value, a signal is generated to perform at least one of the following actions: suppress use of altitude measurements from the radio altimeter that is malfunctioning by other aircraft systems, emit an alarm to a crew regarding the radio altimeter malfunctioning, and notify maintenance personnel regarding a need to fix the radio altimeter that is malfunctioning.

13. The device according to claim 10, wherein the comparing of the measured duration to the predetermined duration reference time is performed by the approach comparison device only a single time during each approach phase operated by the aircraft, thereby limiting use of resources on the aircraft to determine when the radio altimeter is malfunctioning.

14. A method for automatically detecting an erroneous height value supplied by a radio altimeter mounted on an aircraft, the method comprising:
automatically performing the following operations during a take-off/throttling up phase of the aircraft:
(a2) measuring, by a take-off measurement device, a measured duration for which the three following conditions are simultaneously met:
the aircraft is in a situation representative of the take-off/throttling up phase;
a current barometric altitude gain is higher than a predetermined barometric value, using a current barometric altitude received by a take-off monitoring system communicating with a barometric altimeter mounted on the aircraft; and
the current height value supplied by the radio altimeter is lower than a predetermined, constant altitude threshold value;
(b2) comparing the measured duration from step (a2) to a predetermined auxiliary reference time; and
(c2) detecting an erroneous height value if the measured duration from step (a2) is higher than the predetermined auxiliary reference time, wherein the detection of the erroneous height value in step (c2) is performed solely on the basis of altitude measurements from the radio altimeter and from the barometric altimeter, and wherein the erroneous height value is indicative of the radio altimeter malfunctioning.

15. The method according to claim 14, wherein the current barometric altitude gain corresponds to the difference between a barometric altitude measured at a time where the take-off/throttling up phase is initiated and the current barometric altitude of the aircraft.

16. The method according to claim 14, wherein the aircraft is manually piloted, and wherein the aircraft is considered to be in a situation representative of the take-off/throttling up phase when a throttle lever is brought in a predetermined take-off/throttling up position.

17. The method according to claim 14, wherein the aircraft is automatically piloted by an autopilot system, and wherein the aircraft is considered to be in a situation representative of the take-off/throttling up phase when a take-off mode or a throttling up mode is activated on the autopilot system.

18. The method according to claim 14, further comprising:
(d2) generating a signal to perform at least one of the following actions when the erroneous height value is detected in step (c2): suppress use of altitude measurements from the radio altimeter that is malfunctioning by other aircraft systems, emit an alarm to a crew regarding the radio altimeter malfunctioning, and notify maintenance personnel regarding a need to fix the radio altimeter that is malfunctioning.

\* \* \* \* \*